US012128958B2

(12) United States Patent
Wang et al.

(10) Patent No.: US 12,128,958 B2
(45) Date of Patent: Oct. 29, 2024

(54) BODY FRAME JOINT AND VEHICLE HAVING SAME

(71) Applicant: BYD COMPANY LIMITED, Guangdong (CN)

(72) Inventors: Zhiqiang Wang, Shenzhen (CN); Fengshou Huang, Shenzhen (CN); Wang Peng, Shenzhen (CN); Zhen Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 367 days.

(21) Appl. No.: 17/680,884

(22) Filed: Feb. 25, 2022

(65) Prior Publication Data

US 2022/0177050 A1 Jun. 9, 2022

Related U.S. Application Data

(63) Continuation of application No. PCT/CN2020/109155, filed on Aug. 14, 2020.

(30) Foreign Application Priority Data

Aug. 30, 2019 (CN) .......................... 201910812488.0

(51) Int. Cl.
*B62D 27/06* (2006.01)
*B62D 21/03* (2006.01)
(52) U.S. Cl.
CPC ........... *B62D 27/065* (2013.01); *B62D 21/03* (2013.01)
(58) Field of Classification Search
CPC ...... B62D 27/065; B62D 21/03; B62D 31/02; B62D 27/023; F16B 7/18
See application file for complete search history.

(56) References Cited

U.S. PATENT DOCUMENTS 3,787,130 A * 1/1974 Hemmings ............ B62D 31/02
403/205
6,094,802 A * 8/2000 Rollin ................... E06B 3/9642
29/897

(Continued)

FOREIGN PATENT DOCUMENTS

BE 871736 A * 5/1979 ........... B62D 29/008
CN 201553201 U 8/2010

(Continued)

OTHER PUBLICATIONS

International Search Report from PCT /CN2020/109155 dated Nov. 18, 2020 (3 pages).

*Primary Examiner* — Lori Lyjak
(74) *Attorney, Agent, or Firm* — Calfee, Halter & Griswold LLP

(57) ABSTRACT

A body frame joint and a vehicle having the same are disclosed. The body frame joint includes a transverse beam connecting plate, provided with a first transverse beam mounting member and a second transverse beam mounting member and mounted to a transverse beam of a body frame by the first transverse beam mounting member and the second transverse beam mounting member; and a longitudinal beam connecting plate, provided with a first longitudinal beam mounting member and a second longitudinal beam mounting member and mounted to a longitudinal beam of the body frame by the first longitudinal beam mounting member and the second longitudinal beam mounting member.

19 Claims, 7 Drawing Sheets

(56) References Cited

U.S. PATENT DOCUMENTS

| | | | |
|---|---|---|---|
| 8,414,068 B1* | 4/2013 | Na | B62D 27/023 |
| | | | 296/193.06 |
| 10,302,249 B1 | 5/2019 | Kelly | |
| 2020/0001925 A1* | 1/2020 | Cassway | B62D 21/12 |

FOREIGN PATENT DOCUMENTS

| | | | | | |
|---|---|---|---|---|---|
| CN | 201694264 | U | | 1/2011 | |
| CN | 102009697 | A | * | 4/2011 | B62D 25/02 |
| CN | 202294972 | U | | 7/2012 | |
| CN | 103318271 | A | | 9/2013 | |
| CN | 106382285 | A | * | 2/2017 | F16B 7/00 |
| CN | 206049801 | U | | 3/2017 | |
| CN | 206067936 | U | | 4/2017 | |
| CN | 206598890 | U | | 10/2017 | |
| CN | 107344575 | A | | 11/2017 | |
| CN | 208947212 | U | | 6/2019 | |
| CN | 109969272 | A | | 7/2019 | |
| DE | 4134332 | A1 | | 4/1993 | |
| EP | 452256 | A | * | 10/1991 | E04B 2/76 |
| EP | 0452256 | A1 | | 10/1991 | |
| EP | 0647555 | | | 12/1997 | |
| FR | 2587067 | A1 | | 3/1987 | |
| JP | H03 199705 | A | | 8/1991 | |

* cited by examiner

BODY FRAME JOINT AND VEHICLE HAVING SAME

CROSS-REFERENCE TO RELATED APPLICATIONS

The application is a continuation application under 35 U.S.C. § 111 of PCT/CN2020/109155 having the international application filing date of Aug. 14, 2020, which further claims priority to Chinese Patent Application No. 201910812488.0, entitled "BODY FRAME JOINT AND VEHICLE HAVING SAME" and filed by BYD Co., Ltd. on Aug. 30, 2019. The entire contents of all of which are incorporated herein by reference.

FIELD

The disclosure relates to the technical field of vehicles, and more specifically, to a body frame joint and a vehicle having the same.

BACKGROUND

In related arts, body frames of vehicles such as commercial vehicles generally have beam structures, wherein transverse beams and longitudinal beams intersect and connect with each other. Junctions of the transverse beams and the longitudinal beams are further fixed by joints. When the joints are connected with the body frames, a plurality of bolts are generally used for connection. Connection points formed by all of the bolts are located in a same plane, resulting in the insufficient connection strength and stiffness and easy deformation at the junctions.

SUMMARY

The disclosure is intended to solve at least one of the technical problems in related arts. Therefore, an object of the disclosure is to provide a body frame joint. The body frame joint has the advantages such as high connection strength and stiffness, desirable torsion resistance, and the like.

A vehicle having the afore-mentioned body frame joint is disclosed.

In order to achieve some of the afore-mentioned objects, an embodiment of a first aspect of the disclosure provides a body frame joint. The body frame joint includes: a transverse beam connecting plate, provided with a first transverse beam mounting member and a second transverse beam mounting member and mounted to a transverse beam of a body frame by the first transverse beam mounting member and the second transverse beam mounting member; and a longitudinal beam connecting plate, connected with the transverse beam connecting plate, provided with a first longitudinal beam mounting member and a second longitudinal beam mounting member and mounted to a longitudinal beam of the body frame by the first longitudinal beam mounting member and the second longitudinal beam mounting member. A central axis of the first transverse beam mounting member and a central axis of the first longitudinal beam mounting member are located in a first plane. A central axis of the second transverse beam mounting member and a central axis of the second longitudinal beam mounting member are located in a second plane. The first plane and the second plane are disposed in parallel.

In the body frame joint according to the embodiments of the disclosure, the first transverse beam mounting member and the second transverse beam mounting member are disposed on the transverse beam connecting plate. The first longitudinal beam mounting member and the second longitudinal beam mounting member are disposed on the longitudinal beam connecting plate. The first plane in which the first transverse beam mounting member and the first longitudinal beam mounting member are located and the second plane in which the second transverse beam mounting member and the second longitudinal beam mounting member are located are spaced apart from each other and arranged in parallel. In this way, the body frame joint and a mounting point of the body frame connect the two planes, so that the stiffness and the strength of the body frame joint are improved, and the torsion resistance is optimized.

In addition, the body frame joint according to the embodiments of the disclosure may further have the following additional technical features.

According to some specific embodiments of the disclosure, the first plane and the second plane are perpendicular to a width direction of the body frame.

According to some specific embodiments of the disclosure, the first transverse beam mounting member includes a first transverse screw rod and a first transverse collar riveted on the first transverse screw rod. The second transverse beam mounting member includes a second transverse screw rod and a second transverse collar riveted on the second transverse screw rod. The first longitudinal beam mounting member includes a first longitudinal screw rod and a first longitudinal collar riveted on the first longitudinal screw rod. The second longitudinal beam mounting member includes a second longitudinal screw rod and a second longitudinal collar riveted on the second longitudinal screw rod.

Further, the transverse beam is configured with a first transverse sliding groove and a second transverse sliding groove. The longitudinal beam is configured with a first longitudinal sliding groove and a second longitudinal sliding groove. The transverse beam connecting plate is provided with a first transverse screw rod hole and a second transverse screw rod hole. The first transverse screw rod passes through the first transverse screw rod hole and is slidably mated with the first transverse sliding groove. The second transverse screw rod passes through the second transverse screw rod hole and is slidably mated with the second transverse sliding groove. The longitudinal beam connecting plate is provided with a first longitudinal screw rod hole and a second longitudinal screw rod hole. The first longitudinal screw rod passes through the first longitudinal screw rod hole and is slidably mated with the first longitudinal sliding groove. The second longitudinal screw rod passes through the second longitudinal screw rod hole and is slidably mated with the second longitudinal sliding groove.

Further, a first transverse gasket between the first transverse screw rod and the transverse beam connecting plate is sleeved on the first transverse screw rod. The first transverse gasket is slidably mated with the first transverse sliding groove. A second transverse gasket between the second transverse screw rod and the transverse beam connecting plate is sleeved on the second transverse screw rod. The second transverse gasket is slidably mated with the second transverse sliding groove. A first longitudinal gasket between the first longitudinal screw rod and the longitudinal beam connecting plate is sleeved on the first longitudinal screw rod. The first longitudinal gasket is slidably mated with the first longitudinal sliding groove. A second longitudinal gasket between the second longitudinal screw rod and the longitudinal beam connecting plate is sleeved on the second longitudinal screw rod. The second longitudinal gasket is slidably mated with the second longitudinal sliding groove.

According to some specific embodiments of the disclosure, an inner side surface of the transverse beam connecting plate and an inner side surface of the longitudinal beam connecting plate are provided with a first inner rib. The first inner rib on the transverse beam connecting plate is connected with the first inner rib on the longitudinal beam connecting plate by a first corner rib provided at a junction of the transverse beam connecting plate and the longitudinal beam connecting plate. The inner side surface of the transverse beam connecting plate and the inner side surface of the longitudinal beam connecting plate are further provided with a second inner rib. The second inner rib on the transverse beam connecting plate is connected with the second inner rib on the longitudinal beam connecting plate by a second corner rib provided at the junction of the transverse beam connecting plate and the longitudinal beam connecting plate. A thickness of the first corner rib is greater than a thickness of the first inner rib. A thickness of the second corner rib is greater than a thickness of the second inner rib.

According to some specific embodiments of the disclosure, the first transverse screw rod hole is configured extending through the first inner rib on the transverse beam connecting plate. The first inner rib on the transverse beam connecting plate is mated with the first transverse sliding groove. The first longitudinal screw rod hole is configured extending through the first inner rib on the longitudinal beam connecting plate. The first inner rib on the longitudinal beam connecting plate is mated with the first longitudinal sliding groove. The first corner rib is mated with a junction of the first transverse sliding groove and the first longitudinal sliding groove. The second transverse screw rod hole is configured extending through the second inner rib on the transverse beam connecting plate. The second inner rib on the transverse beam connecting plate is mated with the second transverse sliding groove. The second longitudinal screw rod hole is configured extending through the second inner rib on the longitudinal beam connecting plate. The second inner rib on the longitudinal beam connecting plate is mated with the second longitudinal sliding groove. The second corner rib is mated with a junction of the second transverse sliding groove and the second longitudinal sliding groove.

According to some specific embodiments of the disclosure, an outer side surface of the transverse beam connecting plate and an outer side surface of the longitudinal beam connecting plate are provided with an outer rib provided at the junction of the transverse beam connecting plate and the longitudinal beam connecting plate, and the outer rib is rounded.

According to some specific embodiments of the disclosure, a plurality of outer ribs are provided and arranged spaced apart from each other along a width direction of the transverse beam connecting plate and the longitudinal beam connecting plate.

According to some specific embodiments of the disclosure, the first transverse beam mounting member is closer to the longitudinal beam connecting plate than the second transverse beam mounting member. The second longitudinal beam mounting member is closer to the transverse beam connecting plate than the first longitudinal beam mounting member.

An embodiment of a second aspect of the disclosure provides a vehicle. The vehicle according to this embodiment of the disclosure includes the body frame joint according to this embodiment of the first aspect of the disclosure and a body frame. The body frame has a transverse beam and a longitudinal beam. The transverse beam is connected with the longitudinal beam.

By means of the body frame joint according to this embodiment of the first aspect of the disclosure, the vehicle according to the embodiments of the disclosure has advantages such as high connection strength, a stable structure, and the like.

BRIEF DESCRIPTION OF THE DRAWINGS

The above advantages of the disclosure will become apparent and comprehensible in the description of the embodiments made taken in conjunction with the accompanying drawings.

In the drawings.

Figure 1:
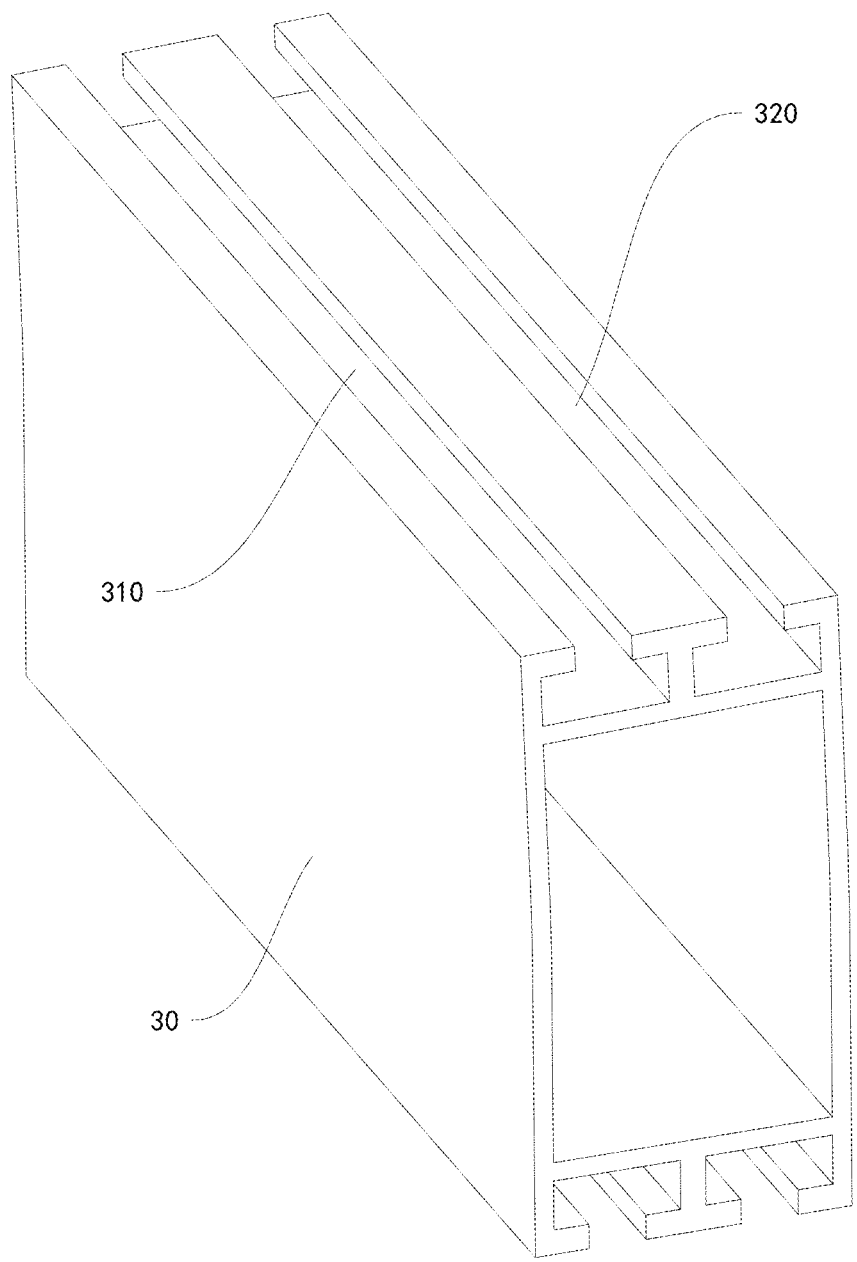
FIG. 1 is a schematic structural diagram of a transverse beam of a body frame according to an embodiment of the disclosure.

Body frame joint 1, Vehicle 2,

Transverse beam connecting plate 10, First transverse beam mounting member 110, Second transverse beam mounting member 120, First transverse screw rod 111, First transverse collar 112, First transverse screw rod hole 113, Second transverse screw rod 121, Second transverse collar 122, Second transverse screw rod hole 123, First transverse gasket 114, Second transverse gasket 124, Longitudinal beam connecting plate 20, First longitudinal beam mounting member 210, Second longitudinal beam mounting member 220, First longitudinal screw rod 211, First longitudinal collar 212, First longitudinal screw rod hole 213, Second longitudinal screw rod 221, Second longitudinal collar 222, Second longitudinal screw rod hole 223, First longitudinal gasket 214, Second longitudinal gasket 224, Transverse beam 30, First transverse sliding groove 310, Second transverse sliding groove 320, Longitudinal beam 40, First longitudinal sliding groove 410, Second longitudinal sliding groove 420, First inner rib 50, First corner rib 510, Second inner rib 60, Second corner rib 610, Outer rib 70.

DETAILED DESCRIPTION

Embodiments of the disclosure are described in detail below, and examples of the embodiments are shown in the accompanying drawings. Wherein the same or similar elements or the elements having same or similar functions are denoted by the same or similar reference numerals throughout the description. The embodiments described below with reference to the accompanying drawings are exemplary and used only for explaining the disclosure, and should not be construed as a limitation on the disclosure.

In the description of the disclosure, it should be understood that orientation or position relationships indicated by the terms such as "center", "vertical", "transverse", "length", "width", "thickness", "above", "below", "top", "bottom", "inside", and "outside" are based on orientation or position relationships shown in the accompanying drawings, and are used only for ease and brevity of illustration and description, rather than indicating or implying that the mentioned apparatus or element needs to have a particular orientation or needs to be constructed and operated in a particular orientation. Therefore, such terms should not be construed as limiting of the disclosure.

In the description of the disclosure, "a plurality of" means two or more than two, "Several" means one or more.

A vehicle 2 according to embodiments of the disclosure is described below with reference to the accompanying drawings.

As shown in FIG. 1 to FIG. 7, the vehicle 2 according to the embodiments of the disclosure includes a body frame and a body frame joint 1.

The body frame has a transverse beam 30 and a longitudinal beam 40. The transverse beam 30 is connected with the longitudinal beam 40. The transverse beam 30 and the longitudinal beam 40 may be made of an aluminum alloy material.

The body frame joint 1 according to the embodiments of the disclosure is first described with reference to the accompanying drawings.

As shown in FIG. 2 to FIG. 6, the body frame joint 1 according to the embodiments of the disclosure includes a transverse beam connecting plate 10 and a longitudinal beam connecting plate 20.

The transverse beam connecting plate 10 is provided with a first transverse beam mounting member 110 and a second transverse beam mounting member 120. The transverse beam connecting plate 10 is mounted to the transverse beam 30 by the first transverse beam mounting member 110 and the second transverse beam mounting member 120. The longitudinal beam connecting plate 20 is connected with the transverse beam connecting plate 10. The longitudinal beam connecting plate 20 is provided with a first longitudinal beam mounting member 210 and a second longitudinal beam mounting member 220. The longitudinal beam connecting plate 20 is mounted to a longitudinal beam 40 by the first longitudinal beam mounting member 210 and the second longitudinal beam mounting member 220.

A central axis of the first transverse beam mounting member 110 and a central axis of the first longitudinal beam mounting member 210 are located in a first plane. A central axis of the second transverse beam mounting member 120 and a central axis of the second longitudinal beam mounting member 220 are located in a second plane. The first plane and the second plane are disposed in parallel.

For example, the body frame joint 1 is connected with the transverse beam 30 and the longitudinal beam 40, which is L-shaped. The first plane and the second plane are spaced apart from each other along a width direction of the vehicle 2, and are perpendicular to a width direction of the body frame.

In the body frame joint 1 according to the embodiments of the disclosure, the first transverse beam mounting member 110 and the second transverse beam mounting member 120 are disposed on the transverse beam connecting plate 10. The first longitudinal beam mounting member 210 and the second longitudinal beam mounting member 220 are disposed on the longitudinal beam connecting plate 20. In this way, the transverse beam connecting plate 10 can be mounted to the transverse beam 30 by using the first transverse beam mounting member 110 and the second transverse beam mounting member 120, and the longitudinal beam connecting plate 20 can be mounted to the longitudinal beam 40 by using the first longitudinal beam mounting member 210 and the second longitudinal beam mounting member 220. In addition, the first plane in which the first transverse beam mounting member 110 and the first longitudinal beam mounting member 210 are located and the second plane in which the second transverse beam mounting member 120 and the second longitudinal beam mounting member 220 are located are spaced apart from each other and arranged in parallel. Therefore, the body frame joint 1 and a mounting point of the body frame connect the two planes, so that the stiffness and the strength of the body frame joint 1 are improved, and the torsion resistance is optimized.

The body frame joint 1 according to the embodiments of the disclosure has the advantages such as high connection strength and stiffness, desirable torsion resistance, and the like.

According to some specific embodiments of the disclosure, as shown in FIG. 2 to FIG. 6, the transverse beam connecting plate 10 and the longitudinal beam connecting plate 20 are disposed perpendicular to each other, and a junction of the transverse beam connecting plate and the longitudinal beam connecting plate is rounded. In this way, the transverse beam connecting plate 10 and the longitudinal beam connecting plate 20 are adapted to be connected with right-angle junctions of the transverse beam 30 and the longitudinal beam 40. Since the transition between the transverse beam connecting plate 10 and the longitudinal beam connecting plate 20 is smooth, the stress concentration can be reduced.

Figure 2:
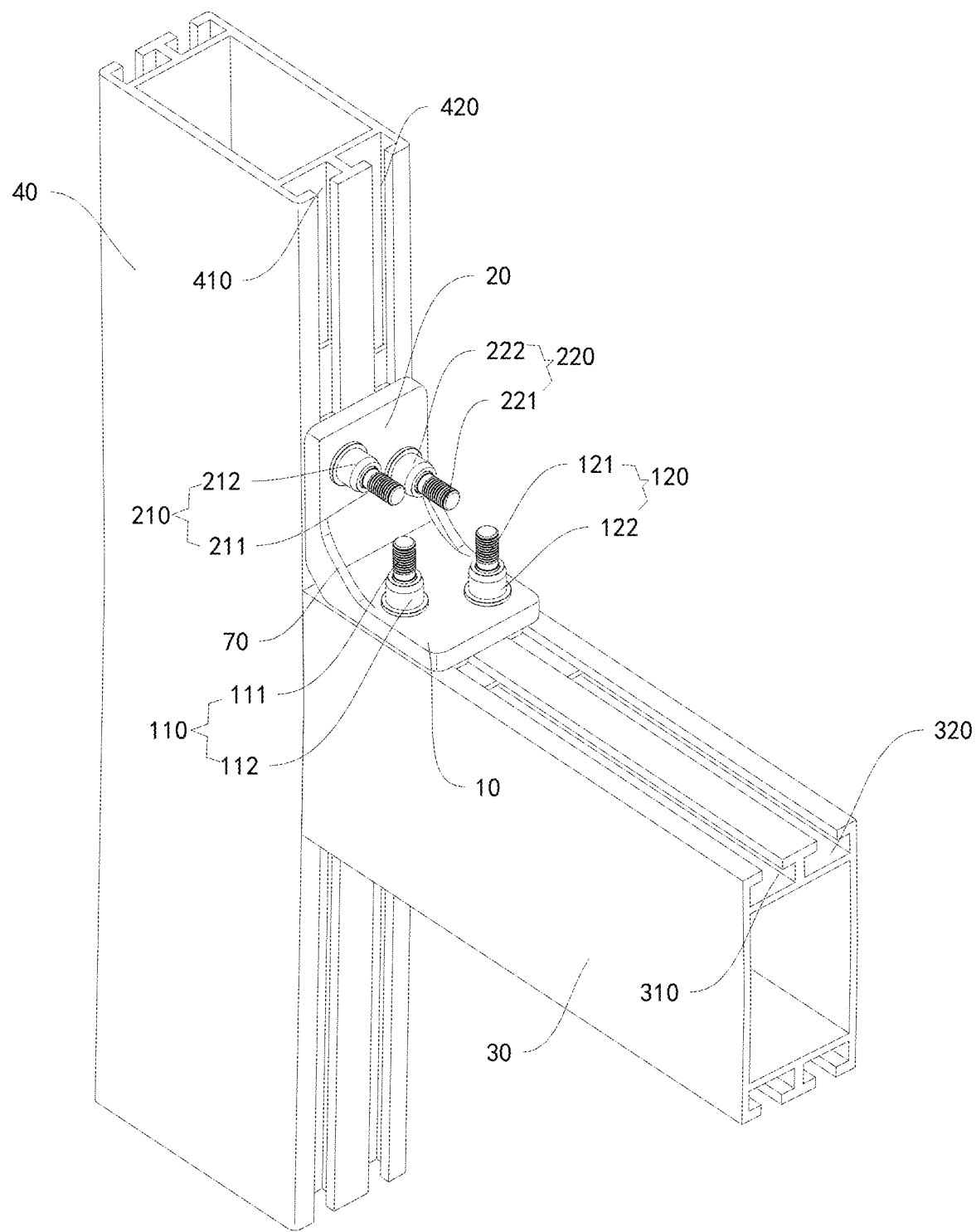
FIG. 2 is a schematic diagram of a connection between a body frame joint and a body frame according to an embodiment of the disclosure.
Figure 3:
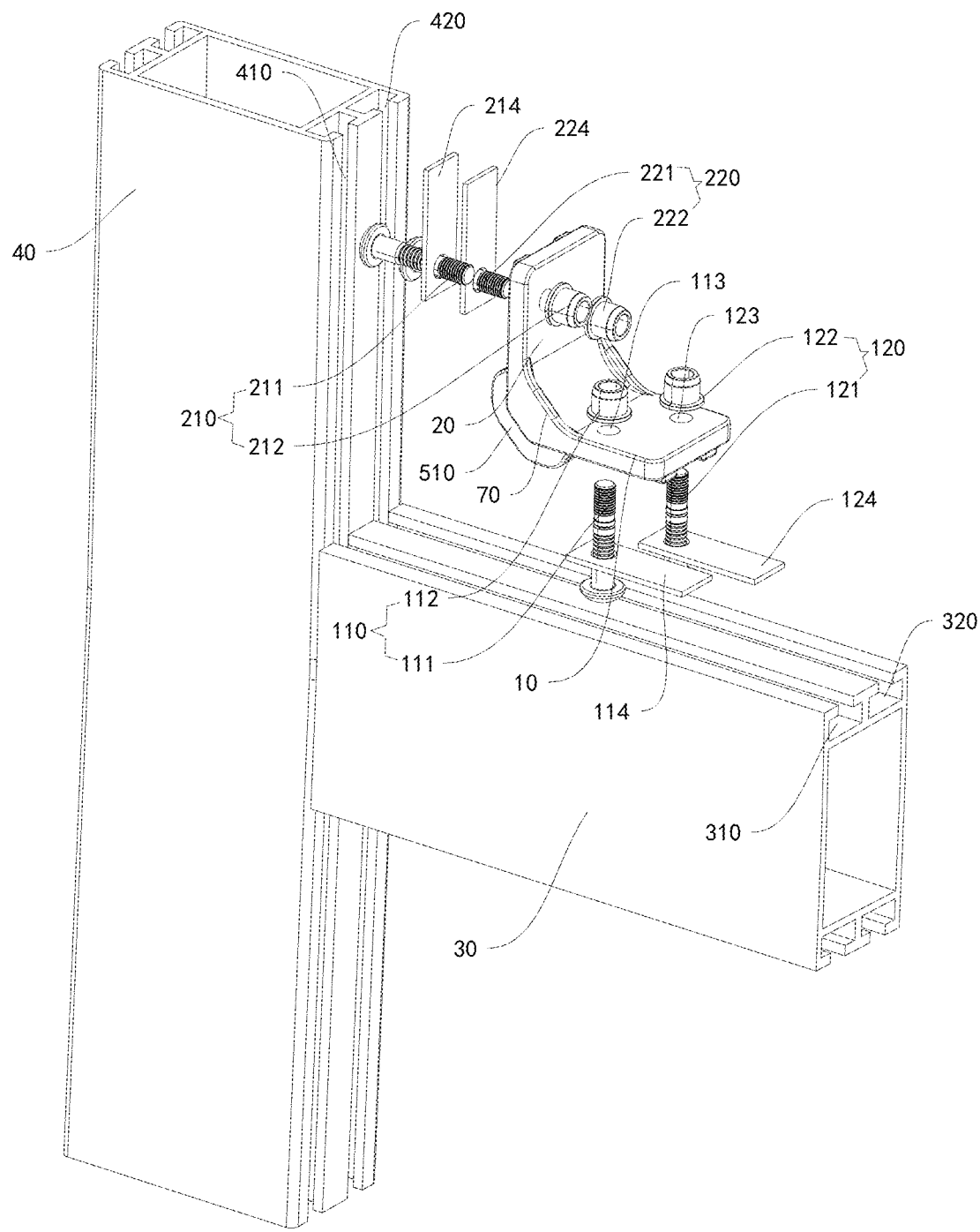
FIG. 3 is an exploded view of the body frame joint and the body frame according to an embodiment of the disclosure.
Figure 4:
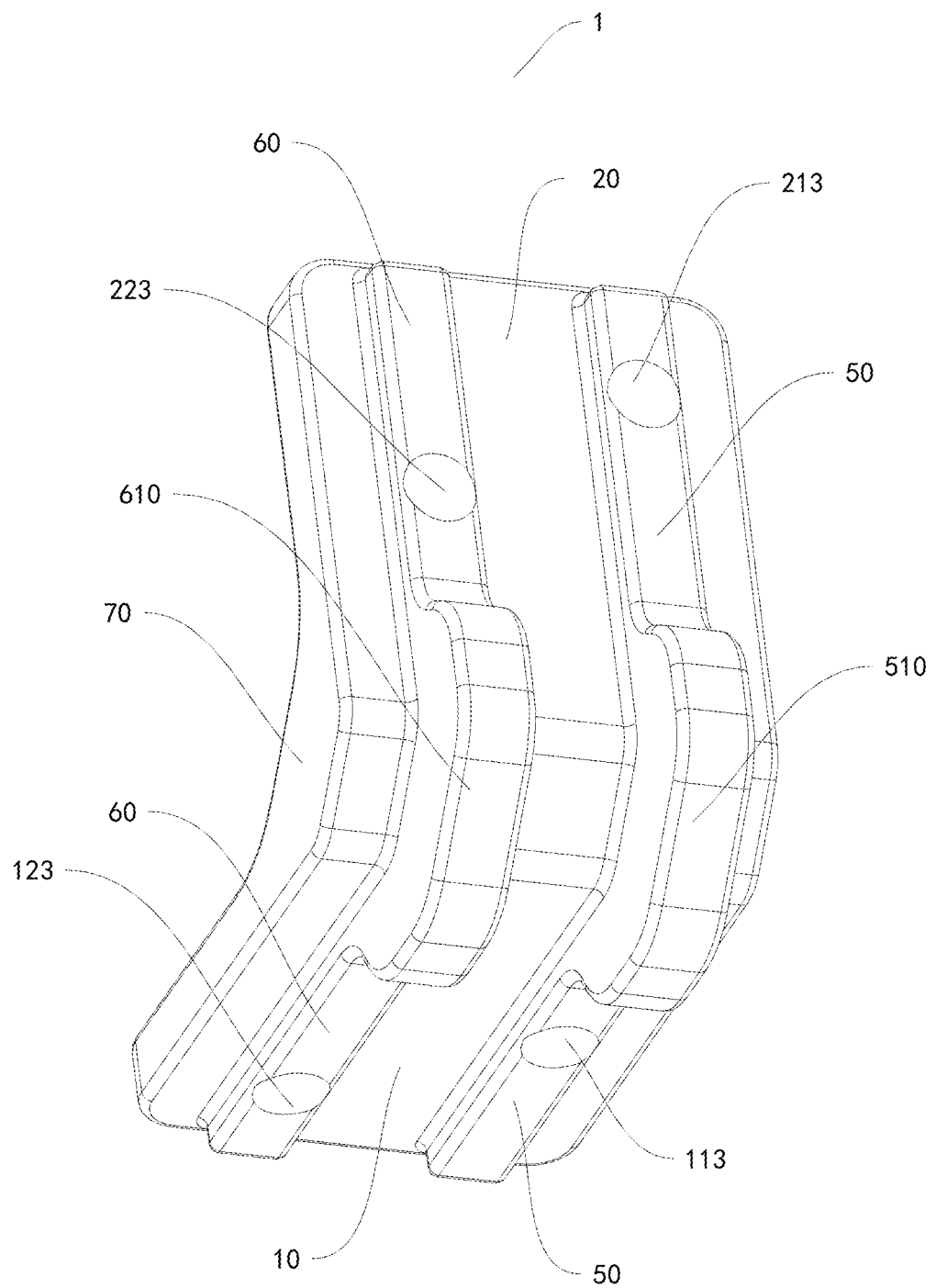
FIG. 4 is a schematic structural diagram of a body frame joint according to an embodiment of the disclosure.
Figure 5:
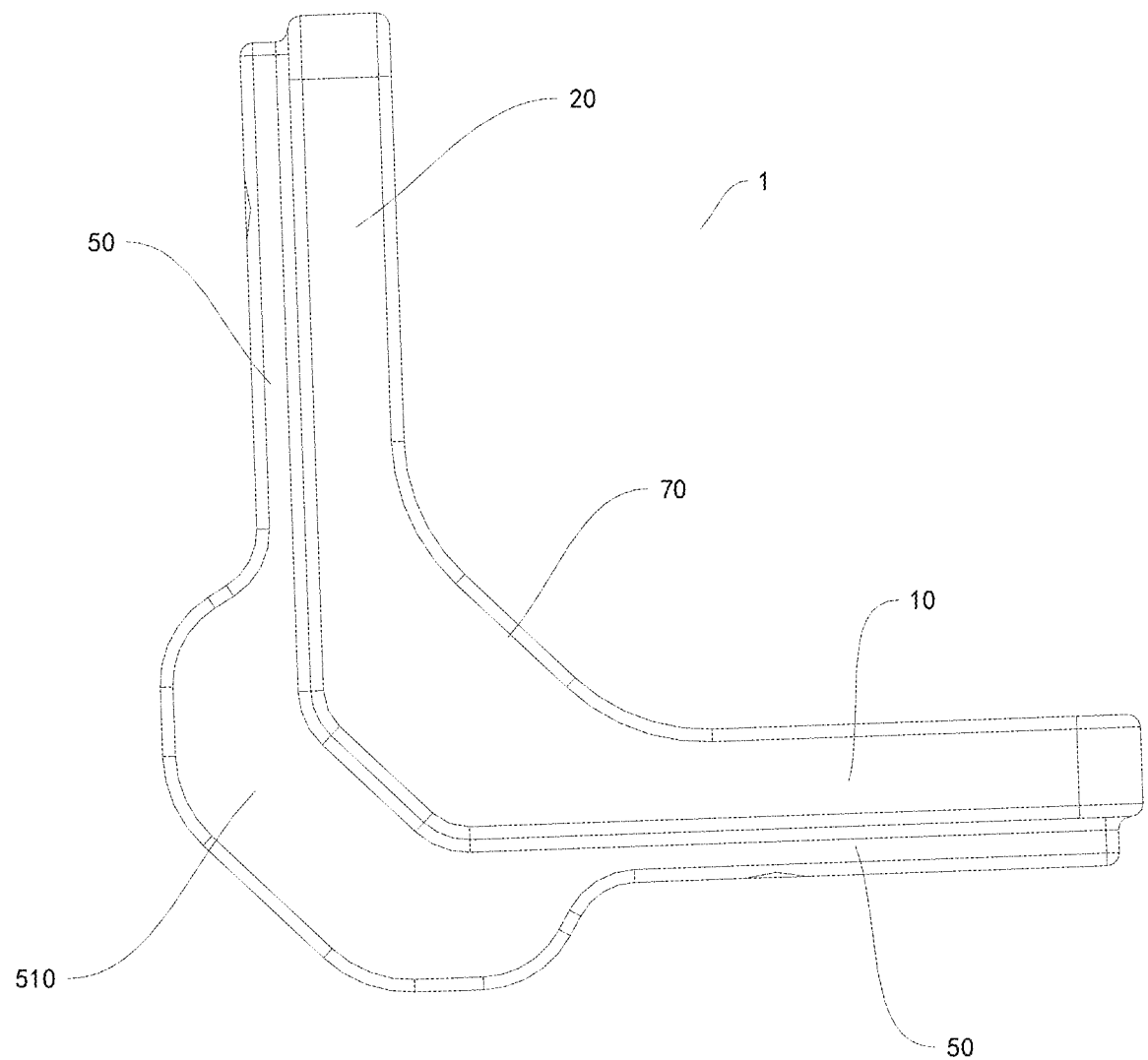
FIG. 5 is a side view of the body frame joint according to an embodiment of the disclosure.
Figure 6:
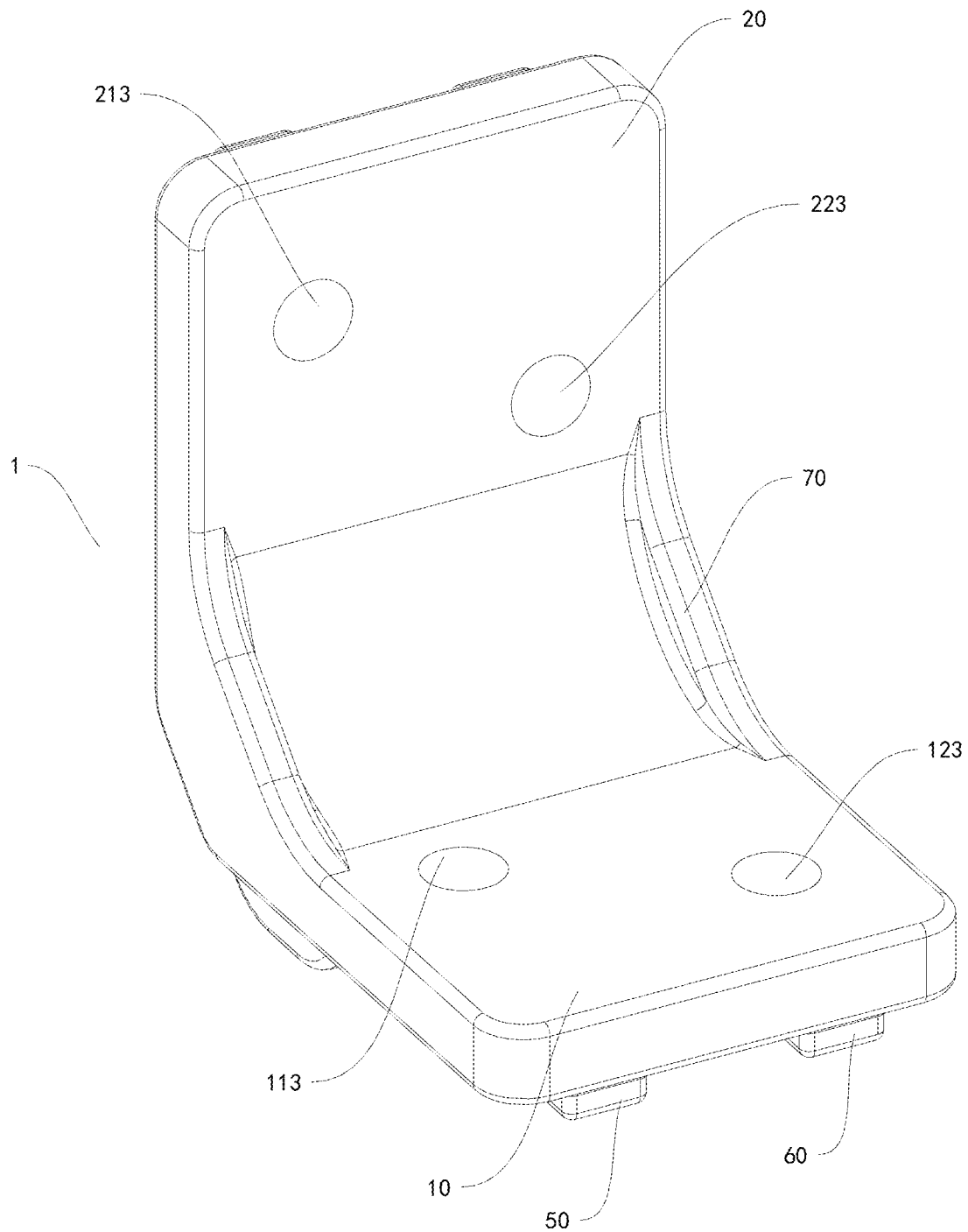
FIG. 6 is a schematic structural diagram of the body frame joint according to an embodiment of the disclosure from another angle.
Figure 7:
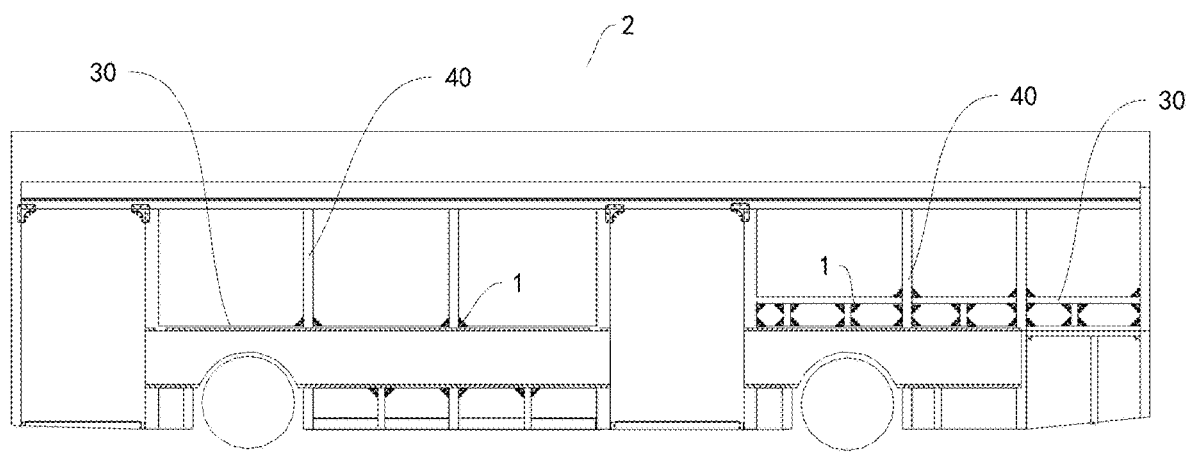
FIG. 7 is a schematic structural diagram of a vehicle according to an embodiment of the disclosure.

According to some specific embodiments of the disclosure, as shown in FIG. 2 to FIG. 3, the first transverse beam mounting member 110 includes a first transverse screw rod 111 and a first transverse collar 112 riveted on the first transverse screw rod 111. The second transverse beam mounting member 120 includes a second transverse screw rod 121 and a second transverse collar 122 riveted on the second transverse screw rod 121. The first longitudinal beam mounting member 210 includes a first longitudinal screw rod 211 and a first longitudinal collar 212 riveted on the first longitudinal screw rod 211. The second longitudinal beam mounting member 220 includes a second longitudinal screw rod 221 and a second longitudinal collar 222 riveted on the second longitudinal screw rod 221.

Further, the transverse beam 30 is configured with a first transverse sliding groove 310 and a second transverse sliding groove 320. The longitudinal beam 40 is configured with a first longitudinal sliding groove 410 and a second longitudinal sliding groove 420. The mating of the structure of double sliding grooves in the transverse beam 30 and the longitudinal beam 40 with a connecting member of the body frame joint 1 improves the stiffness, the strength, and the torsion resistance of the body frame.

The transverse beam connecting plate 10 is provided with a first transverse screw rod hole 113 and a second transverse screw rod hole 123. The first transverse screw rod 111 passes through the first transverse screw rod hole 113 and is slidably mated with the first transverse sliding groove 310. The second transverse screw rod 121 passes through the second transverse screw rod hole 123 and is slidably mated with the second transverse sliding groove 320. The longitudinal beam connecting plate 20 is provided with a first longitudinal screw rod hole 213 and a second longitudinal screw rod hole 223. The first longitudinal screw rod 211 passes through the first longitudinal screw rod hole 213 and is slidably mated with the first longitudinal sliding groove 410. The second longitudinal screw rod 221 passes through the second longitudinal screw rod hole 223 and is slidably mated with the second longitudinal sliding groove 420.

The parts of the first transverse screw rod 111, the second transverse screw rod 121, the first longitudinal screw rod 211, and the second longitudinal screw rod 221 respectively exposed from the first transverse collar 112, the second transverse collar 122, the first longitudinal collar 212, and the second longitudinal collar 222 are required to be minimized to reduce the operation space and facilitate the designing of interior trim of the vehicle. The first transverse sliding groove 310 and the second transverse sliding groove 320 extend along a length direction of the vehicle 2, and are spaced apart from each other along a width direction of the vehicle 2. The first longitudinal sliding groove 410 and the second longitudinal sliding groove 420 extend in a height direction of the vehicle 2, and are spaced apart from each other along a width direction of the vehicle 2.

In this way, the body frame joint 1 is mounted to the body frame by using sliding grooves, so that the high mounting efficiency is achieved, and drilling is not required during the mounting, ensuring the structural strength. In addition, the bolted connection in related arts is replaced with riveting, so that loosening due to insufficient tightening torque can be avoided, thereby ensuring the reliability of the connection. According to some specific embodiments of the disclosure, as shown in FIG. 2 to FIG. 3, a first transverse gasket 114 between the first transverse screw rod 111 and the transverse beam connecting plate 10 is sleeved on the first transverse screw rod 111. The first transverse gasket 114 is slidably mated with the first transverse sliding groove 310. A second transverse gasket 124 between the second transverse screw rod 121 and the transverse beam connecting plate 10 is sleeved on the second transverse screw rod 121. The second transverse gasket 124 is slidably mated with the second transverse sliding groove 320.

A first longitudinal gasket 214 between the first longitudinal screw rod 211 and the longitudinal beam connecting plate 20 is sleeved on the first longitudinal screw rod 211. The first longitudinal gasket 214 is slidably mated with the first longitudinal sliding groove 410. A second longitudinal gasket 224 between the second longitudinal screw rod 221 and the longitudinal beam connecting plate 20 is sleeved on the second longitudinal screw rod 221. The second longitudinal gasket 224 is slidably mated with the second longitudinal sliding groove 420.

For example, the first transverse gasket 114, the first longitudinal gasket 214, the second transverse gasket 124, and the second longitudinal gasket 224 each may be a metal sheet such as an aluminum alloy sheet. The first transverse gasket, the first longitudinal gasket, the second transverse gasket, and the second longitudinal gasket each may be provided with a through hole on a center line for mounting the first transverse screw rod 111, the first longitudinal screw rod 211, the second transverse screw rod 121, and the second longitudinal screw rod 221. Sizes of the through holes may be increased or decreased according to actual conditions. After the mounting is finished, the first transverse gasket 114, the first longitudinal gasket 214, the second transverse gasket 124, and the second longitudinal gasket 224 are respectively attached to bottoms of the first transverse sliding groove 310, the first longitudinal sliding groove 410, the second transverse sliding groove 320, and the second longitudinal sliding groove 420.

The first transverse gasket 114, the first longitudinal gasket 214, the second transverse gasket 124, and the second longitudinal gasket 224 adopt the metal sheet, so that the weight of the vehicle can be effectively reduced. In addition, when the transverse beam 30 and the longitudinal beam 40 are stressed, loads are applied to contact surfaces of the first transverse gasket 114, the first longitudinal gasket 214, the second transverse gasket 124, and the second longitudinal gasket 224 with the first transverse sliding groove 310, the first longitudinal sliding groove 410, the second transverse sliding groove 320, and the second longitudinal sliding groove 420. Therefore, the stress concentration of the first transverse sliding groove 310, the first longitudinal sliding groove 410, the second transverse sliding groove 320, and the second longitudinal sliding groove 420 can be reduced, so that the requirements for the strength and deformation of the body frame can be satisfied.

According to some specific embodiments of the disclosure, as shown in FIG. 2 to FIG. 6, an inner side surface of the transverse beam connecting plate 10 and an inner side surface of the longitudinal beam connecting plate 20 are provided with a first inner rib 50. The first inner rib 50 on the transverse beam connecting plate 10 is connected with the first inner rib 50 on the longitudinal beam connecting plate 20 by a first corner rib 510 provided at a junction of the transverse beam connecting plate 10 and the longitudinal beam connecting plate 20. The inner side surface of the transverse beam connecting plate 10 and the inner side surface of the longitudinal beam connecting plate 20 are further provided with a second inner rib 60. The second inner rib 60 on the transverse beam connecting plate 10 is connected with the second inner rib 60 on the longitudinal beam connecting plate 20 by a second corner rib 610 provided at the junction of the transverse beam connecting plate 10 and the longitudinal beam connecting plate 20. The inner side surface of the transverse beam connecting plate is a surface of the transverse beam connecting plate facing the transverse beam. The inner side surface of the longitudinal beam connecting plate is a surface of the longitudinal beam connecting plate facing the longitudinal beam.

Specifically, a thickness of the first corner rib 510 is greater than a thickness of the first inner rib 50, and a thickness of the second corner rib 610 is greater than a thickness of the second inner rib 60.

For example, the first inner rib 50 on the transverse beam connecting plate 10, the first inner rib 50 on the longitudinal beam connecting plate 20, and the first corner rib 510 may be located in the first plane. The second inner rib 60 on the transverse beam connecting plate 10, the second inner rib 60 on the longitudinal beam connecting plate 20, and the second corner rib 610 may be located in the second plane.

In this way, by means of the arrangement of the first inner rib 50, the second inner rib 60, the first corner rib 510, and the second corner rib 610, the body frame joint 1 has a compact structure, high structural strength, good connection strength, and high durability.

According to some specific embodiments of the disclosure, as shown in FIG. 2 to FIG. 3, the first transverse screw rod hole 111 is configured extending through the first inner rib 50 on the transverse beam connecting plate 10. The first inner rib 50 on the transverse beam connecting plate 10 is mated with the first transverse sliding groove 310. The first longitudinal screw rod hole 211 is configured extending through the first inner rib 50 on the longitudinal beam connecting plate 20. The first inner rib 50 on the longitudinal beam connecting plate 20 is mated with the first longitudinal sliding groove 410. The first corner rib 510 is mated with a junction of the first transverse sliding groove 310 and the first longitudinal sliding groove 410. The second transverse screw rod hole 123 is configured extending through the second inner rib 60 on the transverse beam connecting plate 10. The second inner rib 60 on the transverse beam connecting plate 10 is mated with the second transverse sliding groove 320. The second longitudinal screw rod hole 221 is configured extending through the second inner rib 60 on the longitudinal beam connecting plate 20. The second inner rib 60 on the longitudinal beam connecting plate 20 is mated with the second longitudinal sliding groove 420. The second corner rib 610 is mated with the junction of the second transverse sliding groove 310 and the second longitudinal sliding groove 420.

For example, the thickness of the first inner rib 50 is less than a wall thickness of a mounting surface of the first transverse sliding groove 310 and a wall thickness of a mounting surface of the first longitudinal sliding groove 410. The thickness of the second inner rib 60 is less than a wall thickness of a mounting surface of the second transverse sliding groove 320 and a wall thickness of a mounting surface of the second longitudinal sliding groove 420. In this way, the first transverse gasket 114, the second transverse gasket 124, the first longitudinal gasket 214, and the second longitudinal gasket 224 respectively come into contact with the first transverse sliding groove 310, the first longitudinal sliding groove 410, the second transverse sliding groove 320, and the second longitudinal sliding groove 420 without coming into contact with the body frame joint 1 during the riveting, so as to avoid looseness of the riveting. The first corner rib 510 and the second corner rib 610 are disposed at positions that do not affect the mounting of the first transverse gasket 114, the second transverse gasket 124, the first longitudinal gasket 214, and the second longitudinal gasket 224, thereby improving the stiffness of the body frame joint 1.

In this way, not only the connection strength between the body frame joint 1 and the body frame but also the structural strength of the body frame joint 1 are improved. The first corner rib 510 is inserted into the first transverse sliding groove 310 and the first longitudinal sliding groove 410. The second corner rib 610 is inserted into the second transverse sliding groove 320 and the second longitudinal sliding groove 420. In this way, the body frame joint 1 is constrained, thereby improving the torsion resistance of the body frame joint 1. The first inner rib 50 is inserted into the first transverse sliding groove 310 and the first longitudinal sliding groove 410. The second inner rib 60 is inserted into the second transverse sliding groove 320 and the second longitudinal sliding groove 420. In this way, the body frame joint 1, the transverse beam 30, and the longitudinal beam 40 jointly resist the deformation, thereby improving the entire stiffness of the vehicle 2.

According to some specific embodiments of the disclosure, as shown in FIG. 2 to FIG. 6, an outer side surface of the transverse beam connecting plate 10 and an outer side surface of the longitudinal beam connecting plate 20 are provided with an outer rib 70 provided at the junction of the transverse beam connecting plate and the longitudinal beam connecting plate, and the outer rib is rounded. The outer side surface of the transverse beam connecting plate is a surface of the transverse beam connecting plate away from the transverse beam. The outer side surface of the longitudinal beam connecting plate is a surface of the longitudinal beam connecting plate away from the longitudinal beam.

In other words, the outer rib 70 connects the transverse beam connecting plate 10 to the longitudinal beam connecting plate 20. The part where the outer rib 70 is connected with the transverse beam connecting plate 10 and the longitudinal beam connecting plate 20 is rounded. Therefore, the connection transition is smooth, and a fillet radius is maximized to reduce the concentration of stress at the junction.

Further, as shown in FIG. 2 to FIG. 6, a plurality of outer ribs 70 are provided and arranged spaced apart from each other along a width direction of the transverse beam connecting plate 10 and the longitudinal beam connecting plate 20. For example, two outer ribs 70 are provided and respectively disposed on two side edges of the body frame joint 1.

In this way, the structural strength, the durability, and the torsion resistance of the body frame joint 1 are improved, and the concentration of stress at corner positions of the body frame joint 1 is reduced.

According to some specific embodiments of the disclosure, as shown in FIG. 2 to FIG. 6, the first transverse beam mounting member 110 is closer to the longitudinal beam connecting plate 20 than the second transverse beam mounting member 120. The second longitudinal beam mounting member 220 is closer to the transverse beam connecting plate 10 than the first longitudinal beam mounting member 210. Therefore, the first transverse beam mounting member 110 and the second transverse beam mounting member 120 may be staggered, and the second longitudinal beam mounting member 220 and the first longitudinal beam mounting member 210 may be staggered. In this way, by using different riveting orders, a smaller size of the body frame joint 1 can be realized, the interior trim design of the vehicle 2 is conveniently achieved, and the space required for the mounting and the mounting time are reduced.

A process of connecting the body frame joint 1 to the body frame is described below.

First, the first transverse gasket 114 is sleeved in the first transverse screw rod 111, the first longitudinal gasket 214 is sleeved in the first longitudinal screw rod 211, the second transverse gasket 124 is sleeved in the second transverse screw rod 121, and the second longitudinal gasket 224 is sleeved in the second longitudinal screw rod 221. Then, the first transverse screw rod 111 and the second transverse screw rod 121 with the gaskets are respectively slid into the first transverse sliding groove 310 and the second transverse sliding groove 320 of the transverse beam 30, and the first longitudinal screw rod 211 and the second longitudinal screw rod 221 with the gaskets are respectively slid into the first longitudinal sliding groove 410 and the second longitudinal sliding groove 420 of the longitudinal beam 40.

Then, the transverse beam connecting plate 10 is sleeved in the first transverse screw rod 111 and the second transverse screw rod hole 123, and the longitudinal beam connecting plate 20 is sleeved in the second longitudinal screw rod 221 and the second longitudinal screw rod hole 223.

Then, the first transverse collar 112 is riveted on the first transverse screw rod 111, the second longitudinal collar 222 is riveted on the second longitudinal screw rod 221, the first longitudinal collar 212 is riveted on the first longitudinal screw rod 211, and the second transverse collar 122 is riveted on the second transverse screw rod 121

Other configurations of the vehicle 2 according to the embodiments of the disclosure are known to those of ordinary skill in the art and will not be described in detail herein. In the description of this specification, description of reference terms such as "a specific embodiment" or "a specific example", means including specific features, structures, materials, or features described in the embodiment or example in at least one embodiment or example of the disclosure. In this specification, exemplary descriptions of the foregoing terms do not necessarily refer to the same embodiment or example. Although the embodiments of the disclosure have been shown and described, a person of ordinary skill in the art should understand that various changes, modifications, replacements and variations may be made to the embodiments without departing from the principles and spirit of the disclosure, and the scope of the disclosure is as defined by the appended claims and their equivalents.

What is claimed is:

1. A body frame joint, comprising:
   a transverse beam connecting plate, having a first transverse screw rod hole and a second transverse screw rod hole;
   a longitudinal beam connecting plate having a first longitudinal screw rod hole and a second longitudinal screw rod hole, the longitudinal beam connecting plate being connected with the transverse beam connecting plate;
   a first transverse beam mounting member including a first transverse screw rod;
   a second transverse bean mounting member including a second transverse screw rod;
   a first longitudinal beam mounting member including a first longitudinal screw rod; and
   a second longitudinal beam mounting member including a second longitudinal screw rod;
   wherein the transverse beam connecting plate is mountable to a longitudinal beam of a body frame by the first and second transverse beam mounting member;
   wherein the longitudinal beam connecting plate is mountable to a longitudinal beam of the body frame by the first and second longitudinal beam mounting members;
   wherein a central axis of the first transverse beam mounting member and a central axis of the first longitudinal beam mounting member are located in a first plane, a central axis of the second transverse beam mounting member and a central axis of the second longitudinal beam mounting member are located in a second plane, and the first plane is parallel to the second plane; and
   where the first transverse screw rod is configured to pass through the first transverse screw rod hole and slidably mate with a first transverse sliding groove of the transverse beam, the second transverse screw rod is configured to pass through the second transverse screw rod hole and slidably mate with a second transverse sliding groove of the transverse beam, the first longitudinal screw rod is configured to pass through the first longitudinal screw rod hole and slidably mate with a first longitudinal groove of the longitudinal beam, and the second longitudinal screw rod is configured to pass through the second longitudinal screw rod hole and slidably mate with a second longitudinal groove of the longitudinal beam.

2. The body frame joint according to claim 1, wherein the first plane and the second plane are perpendicular to a width direction of the body frame.

3. The body frame joint according to claim 1, wherein the first transverse beam mounting member comprises a first transverse collar riveted on the first transverse screw rod, the second transverse beam mounting member comprises a second transverse collar riveted on the second transverse screw rod, the first longitudinal beam mounting member comprises a first longitudinal collar riveted on the first longitudinal screw rod, and the second longitudinal beam mounting member comprises a second longitudinal collar riveted on the second longitudinal screw rod.

4. The body frame joint according to claim 1, further comprising
   a first transverse gasket sleeved on the first transverse screw rod and configured to slidably mate with the first transverse sliding groove;
   a second transverse gasket sleeved on the second transverse screw rod and configured to slidably mate with the second transverse sliding groove;
   a first longitudinal gasket sleeved on the first longitudinal screw rod and configured to slidably mate with the first longitudinal sliding groove; and
   a second longitudinal gasket sleeved on the second longitudinal screw rod and configured to slidably mate with the second longitudinal sliding groove.

5. The body frame joint according to claim 1, wherein an inner side surface of the transverse beam connecting plate and an inner side surface of the longitudinal beam connecting plate each include a first inner rib, the first inner rib of the transverse beam connecting plate being connected with the first inner rib of the longitudinal beam connecting plate by a first corner rib disposed along a junction of the transverse beam connecting plate and the longitudinal beam connecting plate; and
   wherein the inner side surface of the transverse beam connecting plate and the inner side surface of the longitudinal beam connecting plate each include a second inner rib, the second inner rib of the transverse beam connecting plate being connected with the second inner rib of the longitudinal beam connecting plate by a second corner rib disposed along the junction of the transverse beam connecting plate and the longitudinal beam connecting plate;
   wherein a thickness of the first corner rib is greater than a thickness of each of the first inner ribs; and
   wherein a thickness of the second corner rib is greater than a thickness of each of the second inner ribs.

6. The body frame joint according to claim 5, wherein the first transverse screw rod hole extends through the first inner rib of the transverse beam connecting plate and the first inner rib of the transverse beam connecting plate is configured to mate with the first transverse sliding groove;
   wherein the first longitudinal screw rod hole extends through the first inner rib of the longitudinal beam connecting plate and the first inner rib of the longitudinal beam connecting plate is configured to mate with the first longitudinal sliding groove;
   wherein the first corner rib is configured to mate with a junction of the first transverse sliding groove and the first longitudinal sliding groove;
   wherein the second transverse screw rod hole extends through the second inner rib of the transverse beam connecting plate, and the second inner rib of the transverse beam connecting plate is configured to mate with the second transverse sliding groove;
   wherein the second longitudinal screw rod hole extends through the second inner rib of the longitudinal beam connecting plate and the second inner rib of the longitudinal beam connecting plate is configured to mate with the second longitudinal sliding groove; and
   wherein the second corner rib is configured to mate with a junction of the second transverse sliding groove and the second longitudinal sliding groove.

7. A body frame joint comprising;
a transverse beam connecting plate;
a longitudinal beam connecting plate connected with the transverse beam connecting plate;
a first transverse beam mounting member including a first transverse screw rod;
a second transverse beam mounting member including a second transverse screw rod;
a first longitudinal beam mounting member including a first longitudinal screw rod; and
a second longitudinal beam mounting member including a second longitudinal screw rod;
wherein the transverse beam connecting plate is mountable to a transverse beam of a body frame by the first and second transverse mounting members;
wherein the longitudinal beam connecting plate is mountable on a longitudinal beam of a body frame by the first and second longitudinal beam mounting members;
wherein a central axis of the first transverse beam mounting member and a central axis of the first longitudinal beam mounting member are located in a first plane, a central axis of the second transverse beam mounting member and a central axis of the second longitudinal beam mounting member are located in a second plane, and the first plane is parallel to the second plane; and
wherein the first transverse beam mounting member is disposed closer to the longitudinal beam connecting plate than the second transverse beam mounting member and the second longitudinal beam mounting member is disposed closer to the transverse beam connecting plate than the first longitudinal beam mounting member.

8. The body frame joint according to claim 4, wherein an inner side surface of the transverse beam connecting plate and an inner side surface of the longitudinal beam connecting plate each include a first inner rib, the first inner rib of the transverse beam connecting plate being connected with the first inner rib of the longitudinal beam connecting plate by a first corner rib disposed along a junction of the transverse beam connecting plate and the longitudinal beam connecting plate;
wherein the inner side surface of the transverse beam connecting plate and the inner side surface of the longitudinal beam connecting plate each include a second inner rib, the second inner rib of the transverse beam connecting plate being connected with the second inner rib of the longitudinal beam connecting plate by a second corner rib disposed along the junction of the transverse beam connecting plate and the longitudinal beam connecting plate;
wherein a thickness of the first corner rib is greater than a thickness of each of the first inner ribs; and
wherein a thickness of the second corner rib is greater than a thickness of each of the second inner ribs.

9. The body frame joint according to claim 7, wherein the first transverse beam mounting member comprises a first transverse collar riveted on the first transverse screw rod, the second transverse beam mounting member comprises a second transverse collar riveted on the second transverse screw rods, the first longitudinal beam mounting member comprises a first longitudinal collar riveted on the first longitudinal screw rods, and the second longitudinal beam mounting member comprises a second longitudinal collar riveted on the second longitudinal screw rod.

10. The body frame joint according to claim 9, wherein the transverse beam connecting plate includes a first transverse screw rod hole and a second transverse screw rod hole;
wherein the first transverse screw rod is configured to pass through the first transverse screw rod hole and slidably mate with a first transverse sliding groove of the transverse beam and the second transverse screw rod is configured to pass through the second transverse screw rod hole and slidably mate with a second transverse sliding groove of the transverse beam;
wherein the longitudinal beam connecting plate includes a first longitudinal screw rod hole and a second longitudinal screw rod hole; and
wherein the first longitudinal screw rod is configured to pass through the first longitudinal screw rod hole and slidably mate with a first longitudinal sliding groove of the longitudinal beam and the second longitudinal screw rod is confirmed to pass through the second longitudinal screw rod hole and slidably mate with a second longitudinal sliding groove of the longitudinal beam.

11. The body frame joint according to claim 10, further comprising:
a first transverse gasket sleeved on the first transverse screw rod and configured to slidably mate with the first transverse sliding groove;
a second transverse gasket sleeved on the second transverse screw rod and configured to slidably mate with the second transverse sliding groove;
a first longitudinal gasket sleeved on the first longitudinal screw rod and confirmed to slidably mate with the first longitudinal sliding groove; and
a second longitudinal gasket sleeved on the second longitudinal screw rod, and configured to slidably mate with the second longitudinal sliding groove.

12. The body frame joint according to claim 11, wherein an inner side surface of the transverse beam connecting plate and an inner side surface of the longitudinal beam connecting plate each include a first inner rib, the first inner rib of the transverse beam connecting plate being connected with the first inner rib of the longitudinal beam connecting plate by a first corner rib disposed along a junction of the transverse beam connecting plate and the longitudinal beam connecting plate;
wherein the inner side surface of the transverse beam connecting plate and the inner side surface of the longitudinal beam connecting plate each include a second inner rib, the second inner rib of the transverse beam connecting plate being connected with the second inner rib of the longitudinal beam connecting plate by a second corner rib disposed along the junction of the transverse beam connecting plate and the longitudinal beam connecting plate;
wherein a thickness of the first corner rib is greater than a thickness of each of the first inner ribs; and
wherein a thickness of the second corner rib is greater than a thickness of each of the second inner ribs.

13. The body frame joint according to claim 12, wherein the first transverse screw rod hole extends through the first inner rib of the transverse beam connecting plate and the first inner rib of the transverse beam connecting plate is configured to mate with the first transverse sliding groove;
wherein the first longitudinal screw rod hole extends through the first inner rib of the longitudinal beam connecting plate and the first inner rib of the longitudinal beam connecting plate is configured to mate with the first longitudinal sliding groove;

wherein the first corner rib is configured to mate with a junction of the first transverse sliding groove and the first longitudinal sliding groove;

wherein the second transverse screw rod hole extends through the second inner rib of the transverse beam connecting plate and the second inner rib of the transverse beam connecting plate is configured to mate with the second transverse sliding groove;

wherein the second longitudinal screw rod hole extends through the second inner rib of the longitudinal beam connecting plate and the second inner rib of the longitudinal beam connecting plate is configured to mate with the second longitudinal sliding groove; and wherein the second corner rib is configured to mate with a junction of the second transverse sliding groove and the second longitudinal sliding groove.

14. The body frame joint according to claim 13, further comprising at least one rounded outer rib disposed on an outer surface of the transverse beam connecting plate and an outer side surface of the longitudinal beam connecting plate at the junction of the transverse beam connecting plate and the longitudinal beam connecting plate.

15. The body frame joint according to claim 14, wherein the at least one rounded outer rib of the transverse beam connecting plate comprises two rounded outer ribs spaced apart from each other along a width direction of the transverse beam connecting plate, and the at least one rounded rib of the longitudinal beam connecting plate comprises two rounded outer ribs spaced apart from each other along a width direction of the longitudinal beam connecting plate.

16. A vehicle, comprising:
a body frame having a transverse beam and a longitudinal beam connected with the longitudinal beam; and
the body frame joint according to claim 1.

17. A body frame joint, comprising:
a transverse beam connecting plate;
a longitudinal beam connecting plate connected with the transverse beam connecting plate;
a first transverse beam mounting member including a first transverse screw rod;
a second transverse beam mounting member including a second transverse screw rod;
a first longitudinal beam mounting member including a first longitudinal screw rod;
a second longitudinal beam mounting member including a second longitudinal screw rod; and
at least one rounded outer rib disposed on an outer side surface of the transverse beam connecting plate and an outer side of the longitudinal beam connecting plate at a junction of the transverse beam connecting plate and the longitudinal beam connecting plate;
wherein the transverse beam connecting plate is mountable to a transverse beam of a body frame by the first and second transverse beam mounting members;
wherein the longitudinal beam connecting plate is mountable to a longitudinal beam of a body frame by the first and second longitudinal beam mounting members; and
wherein a central axis of the first transverse beam mounting member and a central axis of the first longitudinal beam mounting member are located in a first plane, a central axis of the second transverse beam mounting member and a central axis of the second longitudinal beam mounting member are located in a second plane, and the first plane is parallel to the second plane.

18. The body frame joint according to claim 17, wherein the at least one rounded outer rib comprises two rounded outer ribs spaced apart from each other along a width direction of the transverse beam connecting plate and the longitudinal beam connecting plate.

19. The body frame joint according to claim 17, wherein the first transverse beam mounting member is disposed closer to the longitudinal beam connecting plate than the second transverse beam mounting member, and the second longitudinal beam mounting member is disposed closer to the transverse beam connecting plate than the first longitudinal beam mounting member.

* * * * *